June 17, 1924.                                                                1,497,670
E. CASSALETTE
SPARE TIRE CARRIER FOR MOTOR VEHICLES
Filed June 28, 1921
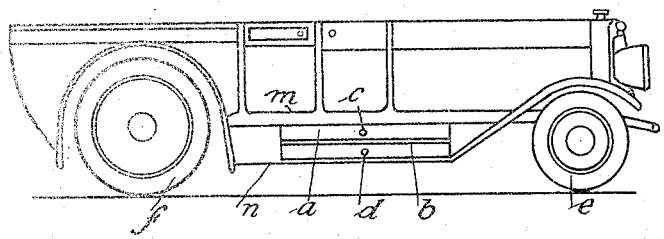
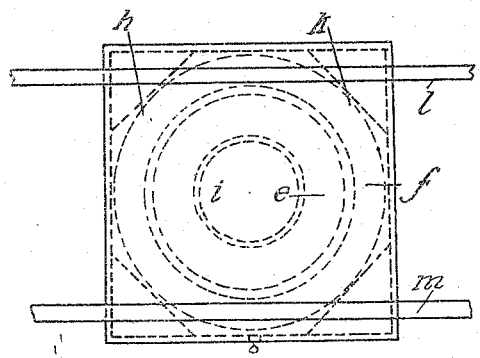
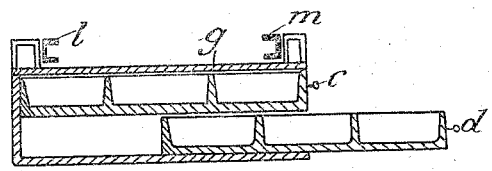
Inventor:
Eddy Cassalette
By: Herbert G. Ry
Attorney.

Patented June 17, 1924.

1,497,670

UNITED STATES PATENT OFFICE.

EDDY CASSALETTE, OF BERLIN-FRIEDENAU, GERMANY.

SPARE-TIRE CARRIER FOR MOTOR VEHICLES.

Application filed June 28, 1921. Serial No. 481,101.

*To all whom it may concern:*

Be it known that I, EDDY CASSALETTE, a citizen of the German Republic, and a resident of Berlin-Friedenau, Germany, have invented certain new and useful Improvements in Spare-Tire Carriers for Motor Vehicles (for which I have obtained Letters Patent in Germany, No. 350,011, on an application filed January 22, 1920), of which the following is a specification.

The spare tires for motor-vehicles are generally carried on the foot boards where they are exposed to the weather and liable to be damaged and stolen.

The object of the present invention is to provide a carrier in which the spare tires can be safely locked up and protected and by which an otherwise unoccupied space can be conveniently utilized, and the invention consists in arranging under the car frame one or more drawers which are adapted to receive the tires and which can be drawn.

In the accompanying drawings the invention is illustrated by way of example,

Fig. 1 representing a side view of a car fitted with the improved tire carrier,

Fig. 2 a plan of the carrier, and

Fig. 3, a vertical section of the same.

Arranged under the bearers $l$, $m$ of the vehicle frame, either between the motor and the transmission gears or behind the latter, is a chest $h$ containing one or more drawers $a$, $b$ disposed so that they can be drawn out from between the vehicle frame and the foot board $n$, as shown in Fig. 1. The drawers are fitted with handles $c$, $d$ as well as with locks and are adapted to hold the spare tires with or without rim. If the tires are of unequal size so that they can be nested, each drawer is formed with a central ring $g$ on which the smaller tire $e$ can be held out of contact with the larger one $f$ which latter is held in position by contact with the side walls of the drawer and with corner pieces $k$ with which the drawer is fitted. The walls have a slightly tapering cross-section so as to grip the tires when receiving the same and hold them rigidly in position.

The central space $i$ enclosed by the ring $g$ and also the spaces behind the corner pieces $k$, may be utilized for the storage of tools, particularly those used in the mounting and dismounting of the tires, and of oil, grease and the like. The air-tubes may be stored inside the tires, and the latter may be connected to rims and inflated.

Carried in this manner the tires will be unobstructive and will be protected from the weather and from damage, and the distribution of weight will not be disturbed by the use of an odd number of spare tires.

The means for avoiding an interference between the power transmission and the driving means on the one hand and the tire-drawers on the other hand are indicated in the description and drawing as follows:

The rear wheel with its tire $f$ is considerably larger than the front wheel with its tire $e$ and has such a size that the transmission shaft between the driving gear and the head of the Cardan shaft is arranged in the height of the longitudinal bearers or beams, that means above the tire carriers the space behind the latter serves for the pivotal connection of the Cardan shaft, which is oscillatable with the rear shaft, with the extended driving shaft. In cars with chain drives, however, the entire driving gear can be arranged between the tire drawers and the connecting shafts between the driving gear and the coupling can be arranged also in the height of the frame. For this purpose, the motor hood, the mudguards etc. are indicated in the drawing as confining members of the adjacent machine parts. In modern autocars the motor, of course, reaches only up to half of to two thirds of the length of the motor hood, as the latter encloses a part of the carriage body or of the pedals respectively which latter are provided on the dash board, said pedals being arranged in a considerable distance from the front door indicated in the drawing.

In the case of cars used only for smaller journeys a single drawer will suffice.

Having thus particularly described the nature of my invention, what I claim as new and desire to secure by Letters Patent of the United States is:

In a spare tire carrier for motor-vehicles, a drawer adapted to receive two nested tires and formed with a central ring by which to hold the inner tire free from contact with the outer one, the latter being supported on the sides of the drawer and on corner pieces fitted in the same, the ring and walls having a tapering cross-section so as to grip the tires when the latter are placed in position, the spaces behind the corner pieces and that within the ring being utilized for the storage of tools and the like.

In testimony whereof I affix my signature in presence of a witness.

EDDY CASSALETTE.

Witness:
J. METIEG.